Nov. 30, 1943.                A. H. HANSON                2,335,247
                    TACHOMETER AND TACHOMETER CIRCUIT
                         Filed March 15, 1941
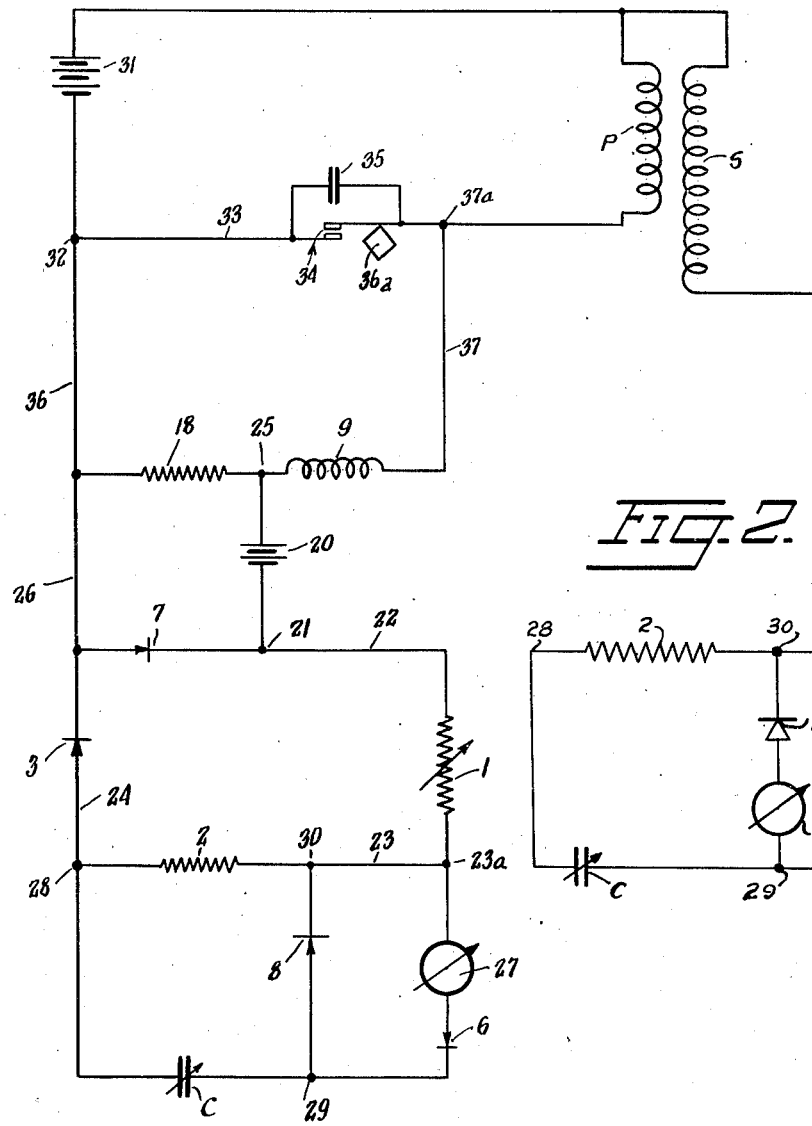
INVENTOR.
Alfred H. Hanson
BY Mock + Blum
ATTORNEYS Patented Nov. 30, 1943

2,335,247

UNITED STATES PATENT OFFICE 2,335,247

TACHOMETER AND TACHOMETER CIRCUIT

Alfred H. Hanson, Garrison, N. Y., assignor to Patterson O. Stewart, New York, N. Y.

Application March 15, 1941, Serial No. 383,488

6 Claims. (Cl. 175—368)

My invention relates to a new and improved tachometer and to a new and improved tachometer circuit. It also relates to a new and improved method of measuring the frequency at which the breaker points of an ignition system which has an ignition battery or other source of ignition current, are successively contacted and separated. The invention is not limited to an ignition system in which the source of ignition current is a battery, although the invention is illustrated in connection with a system of this type.

One of the objects of the invention is to measure the speed of revolution of a shaft of an internal combustion engine, said engine having an ignition circuit which includes breaker points.

Another object of the invention is to provide an improved tachometer of the type shown in U. S. Patent No. 838,410 issued to Holz on December 11, 1906, and German Patent No. 304,091 issued on March 1, 1918.

Another object of the invention is to measure the speed of rotation of the shaft of an internal combustion engine, by periodically charging and discharging a capacity which is charged to a maximum predetermined voltage, so that the rate at which current is supplied to said capacity, indicates the speed of revolution of the internal combustion engine.

Another object of the invention is to provide an improved system of rectifiers, in a circuit of the above-mentioned type, so as to block the current from the source of ignition current, from said capacity.

Other objects of the invention are set forth in the annexed description and diagrammatic drawing, which illustrates a preferred embodiment of the improved circuit. Fig. 1 is a diagrammatic view which illustrates the circuit and the essential parts of the improved system. Fig. 2 is a partial view of a modification. For convenience, it is assumed that the tachometer is applied to an ignition system which has a six-volt storage battery 31, a primary coil P, a secondary coil S, the breaker points 34, and the usual timer-cam 36a, which rapidly makes and breaks the circuit between the breaker points 34.

The usual condenser 35 is connected in shunt across the breaker points 34. The tachometer apparatus includes a battery 20, which is preferably a three-volt battery. In any event, the voltage of the battery 20 is less than the voltage of the battery 31. The battery 20 may be replaced by an auxiliary source of current. The plus side of the battery 20 is connected to the point 21, and the negative side of said battery 20 is connected to the point 25. Current can therefore flow from the positive terminal of battery 20 to point 21, through wire 22 and the adjustable resistor 1 to point 23a, through wire 23 and resistor 2 to point 28, through wire 24 and rectifier 3 and wire 26 and resistor 18 to the point 25 and to the negative terminal of said battery 20. At the point 23a, current can flow through meter 27 and rectifier 6 and capacitance C to point 28, and through wire 24 and rectifier 3 and wire 26 and resistor 18 to point 25 to the negative terminal of battery 20, thus charging the capacitance C. The meter 27 and the capacitance or condenser C are therefore located in a shunt circuit. The capacitance C will therefore be changed to a predetermined voltage, which depends upon the voltage drop across the resistance 2. Ordinarily, if the voltage of the battery 20 is three volts, the voltage drop across the resistance 2 will be 0.2 of a volt, so that the capacitance C will be charged to 0.2 of a volt. At the point 29, current can flow through the rectifier 8, to the point 30.

The plus terminal of the ignition battery 31 is connected to the point 32, and through the wire 33 to the respective fixed breaker point 34. The point 32 is connected to one end of the resistance 18 by means of the wire 36. The resistance 18 is arranged in series with an inductance 9, which is connected by the wire 37 to the point 37a. This point 37a is connected to the movable breaker point 34, and to the respective end of the primary coil P.

The operation of this device is as follows:

When the breaker points 34 are in contact, current will flow from the plus side of the ignition battery 31 to the point 32, and through the wire 33 and the breaker points 34 to the point 37a and through the primary coil P to the negative side of the ignition battery 31. During the interval in which the breaker points 34 contact with each other, they have substantially zero resistance. During said period, no current will flow through the shunt circuit which comprises the wire 36 and the resistance 18 and the inductance 9 and the wire 37, because of said zero resistance across the contacting breaker points 34.

Without limiting the invention to any specific example or figures given herein, and merely for the purpose of clearly stating an operative embodiment of the invention, the value of the resistance 18 is eighteen ohms and the equivalent direction current resistance of the inductance 9 is equal to nine ohms.

During the period or interval in which the breaker points 34 are in contact, current will flow from the plus side of the tachometer battery 20 to the point 21, through the wire 22 and the variable resistance 1 to the point 23a, and through the meter 27 and the rectifier 6 and across the condenser C to the point 28, and through wire 24 and rectifier 3 and wire 26 and resistance 18 to the negative point 25, thus charging the condenser. During this interval, substantially no current will flow through the rectifier 8, between the points 29 and 30, because there is substantially zero resistance between the points 23a and 30. No. current will flow directly from point 21 through wire 26, as this is blocked by rectifier 7.

The condenser C will be charged to the aforesaid maximum voltage of about 0.2 of a volt, during each period or interval in which the breaker points 34 are in contact. Hence a current pulse of fixed total energy will flow through meter 27, during each "make" interval.

During the "break" interval in which the breaker points 34 are separated, current will flow from the plus side of the battery 31 to the point 32, through the wire 36 and the resistance 18 and the inductance 9 and the wire 37 to the point 37a, so that the circuit of the ignition battery 31 will still be closed across the primary coil P.

However, the resistance 18 and the inductance 9 are sufficiently high to produce a sufficiently rapid and substantial drop of the current in the primary coil P, so as to secure the usual discharge across the terminals of the spark plug which is connected to the ends of the secondary coil S. Hence the application of the tachometer does not interfere substantially with the speed of the engine, during the test.

The period during which the breaker points 34 are separated may be designated, for convenience, as the "break" or ignition period. Likewise, the period during which the breaker points 34 are in contact with each other, may be designated as the "make" or charging period, since the condenser C is charged during said charging period.

During the "break" or ignition period, the current from the plus side of the battery 31 cannot pass through the opposed rectifier 3. During the "break" period, the condenser C cannot discharge through the meter 27 in the embodiment of Fig. 1, because this is prevented by the rectifier 6. The condenser C can and will completely discharge, during the "break" or ignition period, across the rectifier 8 to the point 30 and through the resistance 2. During the "break" or ignition period, current flows from the plus side of the battery 31 to the point 32, through the wires 36 and 26 and through the rectifier 7 to the point 21, through the battery 20 to the point 25, and through the inductance 9 and the wire 37 to the point 37a. The resistance 18 is sufficiently high so that the voltage drop across said resistance 18 of the current of the ignition battery 31, exceeds the voltage of the auxiliary tachometer battery 20. Hence the discharge circuit of the condenser C is separated wholly from the other circuits during each "break" period, and also from batteries 31 and 20, so that said condenser C can discharge to zero potential during each "break" period.

Therefore, a predetermined electrical energy pulse is sent through the meter 27 during each "make" of the points 34. During each "break" of the points 34, the condenser C is discharged to zero potential, but without discharging through the meter 27 in the embodiment of Fig. 1.

The meter 27 is of any suitable type which will record the current which is supplied to condenser C. Hence the reading of the meter 27 will indicate the number of "break" intervals per minute and the speed at which the shaft of cam 36 is rotating.

The value of the resistance 2 is about fifty ohms and the capacity of the condenser C may be six microfarads. The value of the resistance 1 can be regulated between a minimum of 2 ohms and a maximum of 25 ohms.

The capacity of the condenser C may be adjustable so that the capacity of said condenser C can be regulated. The meter 27 can be calibrated according to the capacity of the condenser C. The rectifiers are preferably of the copper oxide type, but they may be of any type.

The values above mentioned are suitable for engine speeds which correspond to a thousand revolutions per minute of the cam shaft, in a four-cycle internal combustion engine. In order to indicate higher speeds, it is advisable to lower the capacity of the condenser C.

The meter 27 is essentially a voltmeter, and the adjustable resistance 1 has the function of the usual external adjustable resistance which is used ordinarily in combination with a voltmeter. The voltmeter 27 may be of any type.

The entire tachometer can be made as a separate unit, so that it is merely necessary to connect the tips of the wires 36 and 37 of said unit, to points of the ignition circuit which are located at opposite sides of the breaker points, namely, to the points 32 and 37a.

It has heretofore been proposed to provide a tachometer whereby current is sent through a meter in the form of a series of intermittent direct-current pulses, the energy of each pulse being equal to the energy which is required to charge a condenser of predetermined capacity to a predetermined voltage. However, in such devices it has been necessary to use a commutator or other mechanically operated switch, for separating the condenser from its charging circuit and for connecting the condenser to a discharge circuit, during each "break" or ignition period. By means of the improved circuit disclosed herein, the condenser is automatically separated from its charging circuit, during the discharge period of the condenser.

According to the improved method of measuring the frequency at which the breaker points 34 are successively contacted and separated, the capacitance C is charged through the meter 27 from the auxiliary battery 20, while the points 34 are contacted. Said capacitance C is discharged through a circuit which excludes the meter 27 while the points 34 are separated. Current is passed from the ignition battery 31, reversely through the auxiliary battery 20, while the points 34 are separated. The voltage drop across resistance 18 may be just equal to, or only slightly greater than, the voltage of battery 20, so that battery 31 substantially only blocks the current of battery 20, during each "break," but without sending any substantial current reversely through battery 20. The rectifier 3 blocks the current of the ignition battery 31 from passing through the capacitance C or through the voltmeter 27. Of course the apparatus and method can be used for measuring the speed of rotation of any shaft, since, in the specific embodiment disclosed, the apparatus measures the speed of rotation of the shaft on which the cam 36a is mounted. The invention includes a system in which only the discharge current of the condenser C is sent through meter 27. Thus, meter 27 could be located between point 29 and rectifier 8, as shown in Fig. 2, which also shows that the capacitance C can be adjustable, in order to vary its capacity. Using the meter to measure the discharge energy of condenser C, is thus equivalent, for the purposes of the claims, to measuring the charging energy of condenser C.

For convenience in defining the parts in a claim or claims, the lower terminal of the ignition battery 31 may be designated as the first terminal thereof and the upper terminal of said battery 31 may be designated as the second terminal thereof. The lower terminal of the auxiliary battery 20 is also designated as the first terminal thereof, and the upper terminal of the battery 20 is designated as the second terminal thereof. The rectifiers 7, 6, 8 and 3 are respectively designated as the first, second, third and fourth rectifiers. The first rectifier 7 is located anterior the fourth rectifier 3, so that the fourth rectifier blocks the current of the battery 21 from the capacity C, while permitting the current of the battery 31 to flow between the wires 36 and 37, and also through the auxiliary battery 20, if the voltage drop across the resistance 18 exceeds the voltage of the battery 20. The portion of the circuit between the points 28 and 23a, which includes resistance 2 and wire 23, may be designated as a shunt connection. The portion of the circuit between the points 29 and 30 may be designated as a connector, which includes the third rectifier 8.

It will be noted that the portion of the circuit which is located above the points 28 and 23a, and which includes the resistor 2, functions as an automatic switching circuit. The effect of this automatic switching circuit is to eliminate the effect of the ignition coil and its condenser, in the reading of the meter 27. The voltage of the battery 31 has no effect upon this switching circuit, as said voltage merely serves in effect to open the meter circuit at the rectifier 3, when the breaker points 34 are separated. The purpose of this automatic switching circuit is to secure a sharp and absolute interruption of current flow from the battery 20 through the resistance 2, when the breaker points 34 are separate. This permits the full discharge of the capacitance C. Likewise, this automatic switching circuit eliminates, under all conditions, the flow of transient or oscillatory currents through the resistor 2, which would otherwise be caused by the separation of the breaker points 34.

As previously stated, the condenser C is charged to about 0.2 volt, during each charging period. If it is assumed that the resistance of resistor 1 is the maximum of 25 ohms which has previously been stated, the total resistance of the circuit of battery 20, through resistors 1, 2 and 18 is 93 ohms, in which case the voltage drop across resistor 2 substantially exceeds 0.2 volt, if the voltage of battery 20 is 3 volts. In such case, the voltage drop across resistor 2 is about 1.6 volts. Hence the charging period is too short to permit the condenser C to be charged to the full applied voltage of 1.6 volts. During the charging period, the charging current must pass through the impedance of the meter 27, in the preferred embodiment of Fig. 1. During the discharging period, the only impedance in the discharge circuit is the resistance of 50 ohms of resistor 2 in the embodiment of Fig. 1. By making said resistance of resistor 2 sufficiently small in relation to the impedance of meter 27, said condenser C will be completely discharged during each discharge period. As previously stated, the capacity of condenser C is diminished as the engine speed is increased, so that the condenser C will be completely discharged during each discharge period.

I have shown a preferred embodiment of my invention, but it is clear that numerous changes and omissions can be made without departing from its spirit.

I claim:

1. A method of measuring the frequency at which the breaker points of an ignition system which has a source of ignition electric current, are successively contacted and separated, which consists in charging a capacity while said points are in contact from an auxiliary source of current, discharging said capacity while said points are separated, measuring the rate at which electrical energy is supplied to said capacity, diminishing the flow of energy from said auxiliary source to said capacity while said points are separated by imposing a counter-voltage on said auxiliary source from said source of ignition current, and blocking the current from said source of ignition current from said capacity.

2. A tachometer device for use in measuring the frequency at which breaker points are successively contacted and separated in an ignition system which has an ignition battery which has a first terminal and a second terminal, said terminals being connected intermittently to a primary coil through said breaker points, said tachometer device having an auxiliary battery, the voltage of said ignition battery being at least substantially equal to the voltage of the auxiliary battery, said device having a pair of wires adapted to be connected to said ignition system at respective points of said ignition system which are located at opposite sides of said breaker points, said auxiliary battery also having a first terminal and a second terminal, the respective first terminals of said batteries being of the same polarity, the respective first terminals of said ignition battery and of said auxiliary battery being connected through a first rectifier which permits current to flow from the first terminal of the ignition battery to the first terminal of said auxiliary battery in a direction towards the second terminal of the ignition battery, said wires being connected to each other in said device through connecting means which include a resistance, the second terminal of the auxiliary battery being connected to said connecting means at a predetermined point, one end of said resistance being connected to said predetermined point and the other end of said resistance being connected to the first terminal of the ignition battery, the voltage drop of the current of the ignition battery across said resistance and up to said predetermined point being at least substantially equal to the voltage of the auxiliary battery when the breaker points are open, the resistance of the breaker points when said breaker points are in contact, being lower than the value of said resistance, the ignition battery stopping the flow of current from the auxiliary battery when the breaker points are separated, a meter and a capacity which are connected in series and through said resistance between said terminals of the auxiliary battery so that the auxiliary battery can charge the capacity by a flow of charging current through the meter in a predetermined direction, a second rectifier located to block the discharge of the capacity through the meter in a direction reverse to the flow of said charging current, the circuit of the auxiliary battery having a shunt connection across the meter and the capacity, said shunt connection omitting said resistance, a connector having one end thereof connected to one terminal of the capacity and to one terminal of the meter at a point intermediate said terminals of the capacity and of the meter, the other end of the connector being connected to said shunt connection, said connector having a third rectifier which permits the flow of discharge current from said terminal of the capacity to the other terminal of the capacity through the respective part of said shunt connection, a fourth rectifier located to block current from said ignition battery through said capacity, the first rectifier being located anterior the fourth rectifier, said fourth rectifier permitting charging current to flow from the auxiliary battery to charge the condenser.

3. A device according to claim 2 in which the shunt connection has two sections of unequal resistance, the section of greater resistance having its ends connected to the terminals of the capacity and being in the discharge circuit of the capacity.

4. A method of measuring the frequency at which the breaker points of an ignition system which has a source of ignition electric current, are successively contacted and separated, which consists in charging a capacity while said points are in contact from an auxiliary source of current, discharging said capacity while said points are separated, measuring the rate at which electrical energy is supplied to said capacity, diminishing the flow of energy from said auxiliary source of said capacity while said points are separated by imposing a counter-voltage on said auxiliary source from said source of ignition current, and blocking the current from said source of ignition current from said capacity, said counter-voltage being at least substantially equal to the voltage of said auxiliary source.

5. A method of measuring the frequency at which the breaker points of an ignition system which has a source of ignition electric current, are successively contacted and separated, which consists in fully charging a capacity from an auxiliary source of current while said points are in contact, fully discharging said capacity while said points are separated, measuring the rate at which electrical energy is supplied to said capacity, stopping all flow of energy from said auxiliary source of current to said capacity, by imposing a counter-voltage on said auxiliary source of current from said source of ignition current, and blocking the current from said source of ignition current from said capacity.

6. A device for measuring the frequency of contact and separation of the breaker points of an ignition system which has a source of ignition current, comprising an auxiliary source of direct current, a charging circuit which includes a meter and a capacity and a rectifier which are arranged in series in said charging circuit, the ends of said charging circuit being respectively connected to the terminals of said auxiliary source, means controlled by a stationary rectifier for imposing a counter-voltage on said auxiliary source to block the flow of current therefrom, only when said breaker points are separated, said capacity being blocked from said source of ignition current, said capacity having a rectifier controlled discharge circuit which is operative only when said breaker points are separated.

ALFRED H. HANSON.